United States Patent [19]

Freeman

[11] Patent Number: 4,966,098
[45] Date of Patent: Oct. 30, 1990

[54] METHOD OF FORMING A GAME AND PET FEEDER

[76] Inventor: Lamont L. Freeman, 1906 Invermere, Spring, Tex. 77386

[21] Appl. No.: 390,980

[22] Filed: Aug. 7, 1989

[51] Int. Cl.[5] ............................................. A01K 39/01
[52] U.S. Cl. .................................. 119/52.2; 119/57.8
[58] Field of Search ............................ 119/52.2, 57.8; DIG. 30/124–128

[56] References Cited

U.S. PATENT DOCUMENTS

| | | | |
|---|---|---|---|
| 3,244,150 | 4/1966 | Blair | 119/52.2 |
| 3,441,002 | 4/1969 | Lawalin et al. | 119/52.2 |
| 4,242,984 | 1/1981 | Smith | 119/52.2 |
| 4,318,364 | 3/1982 | Bescherer | 119/57.8 |
| 4,712,512 | 12/1987 | Schreib et al. | 119/52.2 |
| 4,829,934 | 5/1989 | Blasbalg | 119/52 R |

*Primary Examiner*—John Weiss
*Attorney, Agent, or Firm*—Leon Gilden

[57] ABSTRACT

A game and pet feeder is formed by the steps of utilizing PVC pipe wherein an elongate cylinder of the pipe is utilized in conjunction with end caps. A first semi-cylindrical slot is directed perpendicularly to the axis of the cylindrical body whereupon heat is applied to a surface extending above the slot and thereafter upon softening of the PVC pipe, a rod is directed against the surface overlying the slot and presented interiorly to force a forward tip of the material overlying the slot to engage a rear wall of the tube. Subsequently, a plurality of securement apertures are directed overlying the mouth formed by the inward directing of the material and a series of apertures are drilled through a lower end cap, whereupon the end cap is secured either through adhesive or mechanical fastening to a lowermost end of the cylindrical body.

Subsequently, the top lid is positioned upon an upper end of the cylindrical body with an aperture directed diametrically therethrough to receive a first cotter pin and a second aperture directed coaxially of the lid to receive a second cotter pin for enabling suspension of the game and pet feeder.

4 Claims, 4 Drawing Sheets

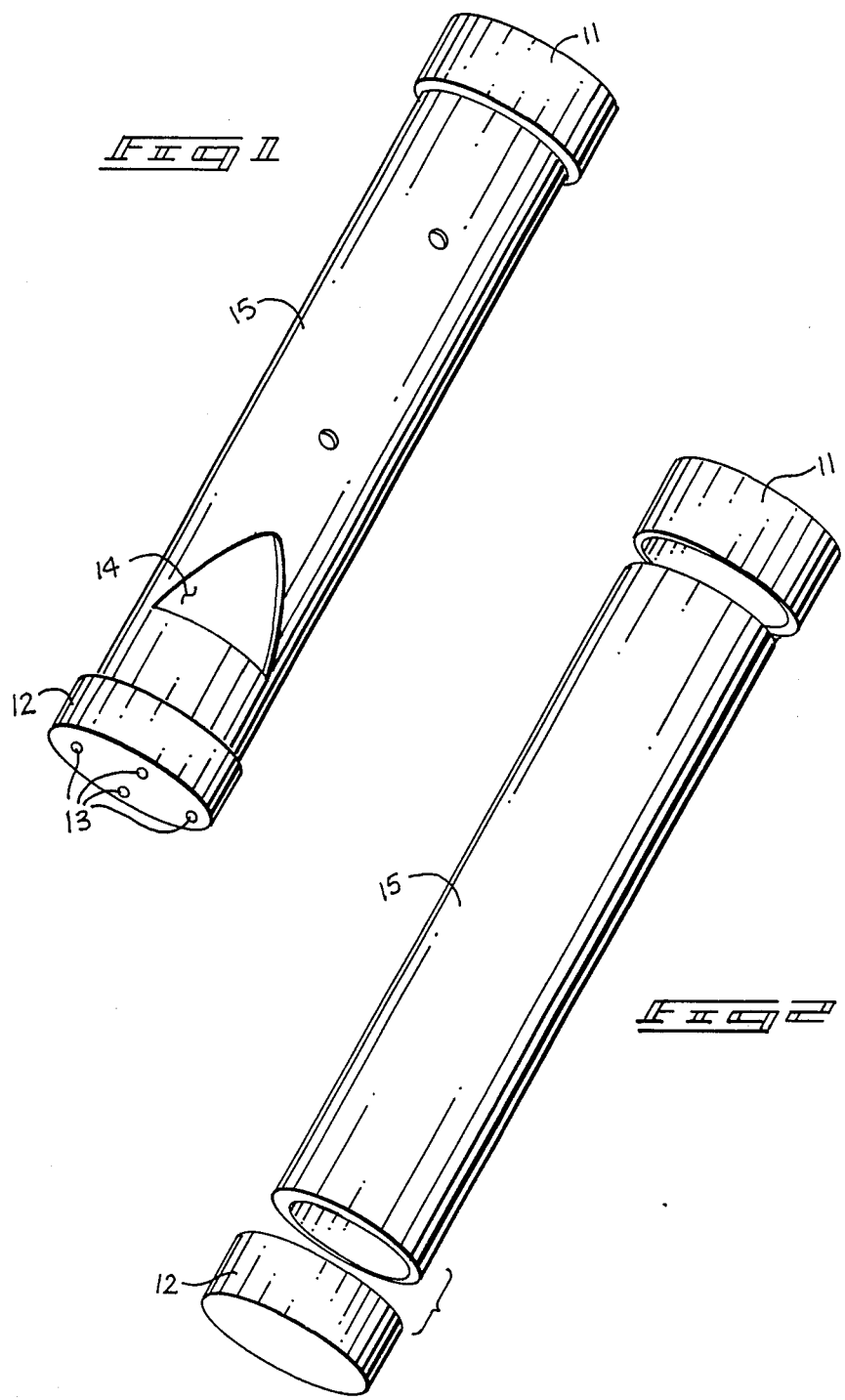

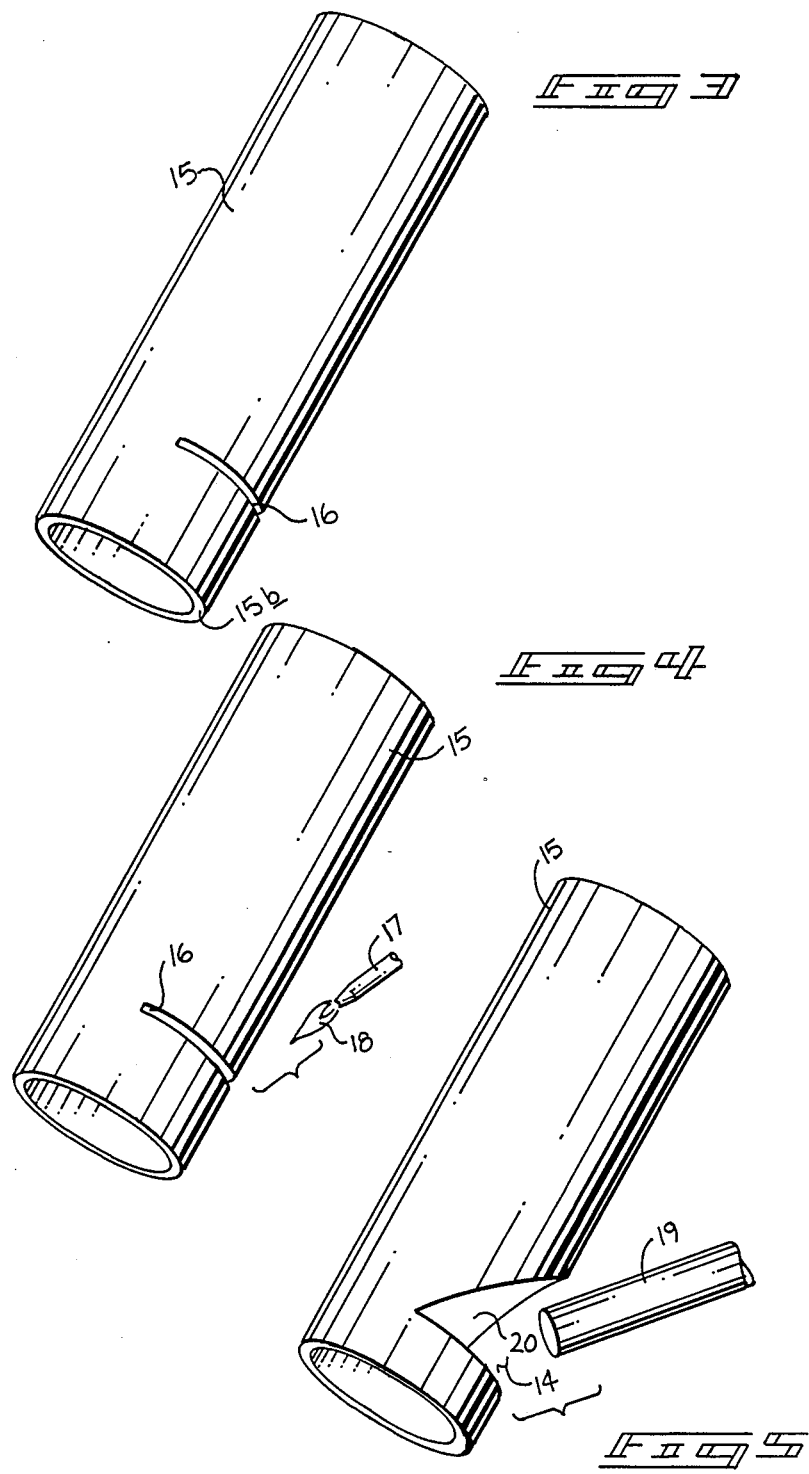

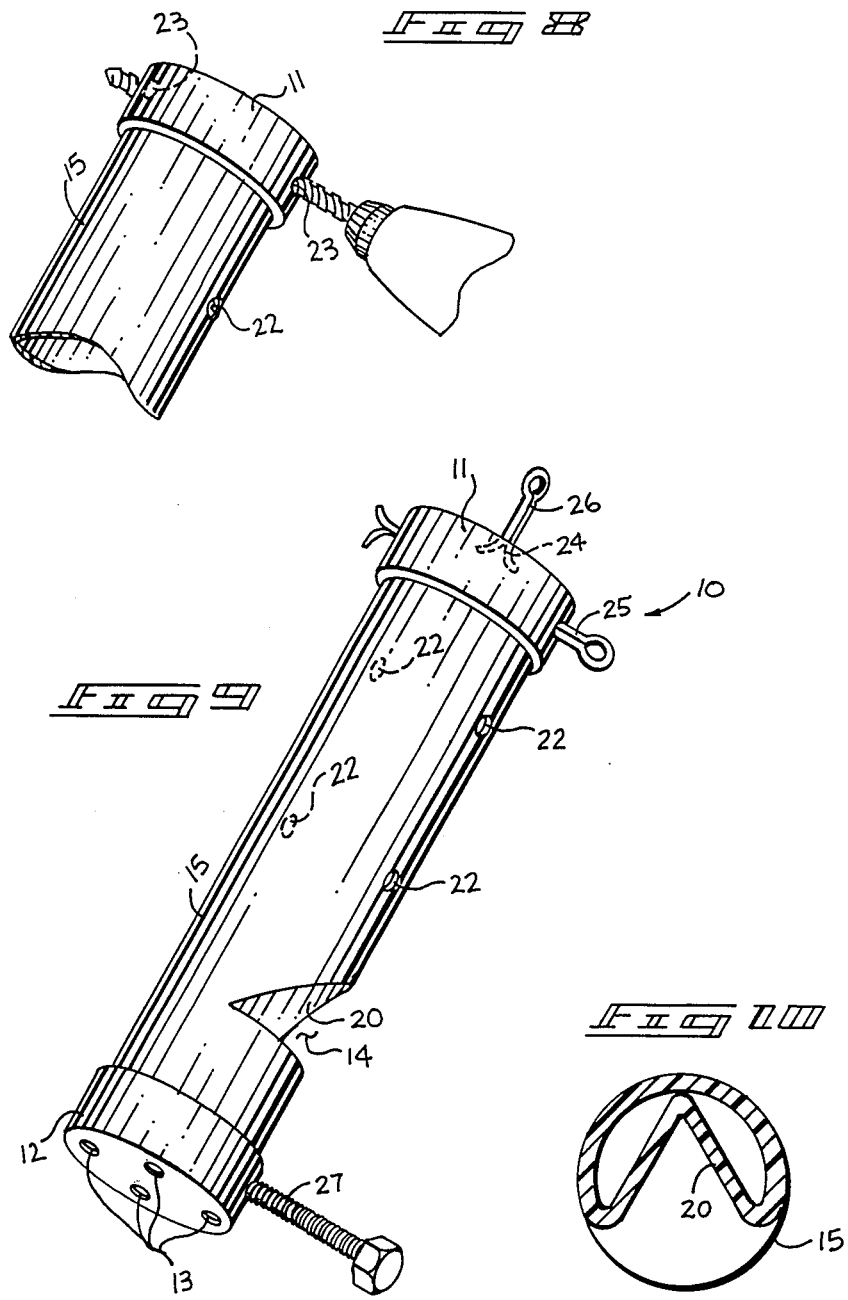

METHOD OF FORMING A GAME AND PET FEEDER

BACKGROUND OF THE INVENTION

1. Field of the Invention

The field of invention relates to feeding devices, and more particularly pertains to a new and improved method of forming a game and pet feeder wherein the same utilizes readily available PVC pipe in construction of a game and pet feeder.

2. Description of the Prior Art

Game and pet feeders of various configurations and types have been utilized throughout the prior art. The feeders of the prior art have been of particular configuration to accommodate various animals and the like, including pets and wild game. The pet and game feeder of the instant invention is formed by the utilization of readily available, inexpensive, and easily manipulatable PVC pipe. Examples of the prior art include Wilhelm U.S. Pat. No. 249,566 providing a generally "L" shaped feeding apparatus utilizing a vertical hopper directed to a horizontal trough.

Bore U.S. Pat. No. 276,277 provides a pet feeder utilizing a generally elongate feeder of square cross-sectional configuration formed with various openings for receiving feed therewithin for its dispensing through an underlying mouth.

Dehls U.S. Pat. No. 277,704 utilizes a generally elongate parallelepiped construction provided with an underlying perch for enabling flying fowl to rest thereupon during feeding.

Schueler U.S. Pat. No. 288,013 utilizes a fluid container converted into a feeder with an underlying screen and rectangular openings to enable access by various game within the container.

Gampp U.S. Pat. No. 3,777,711 provides for a wildlife station holder wherein four sides extend upwardly from a planar bottom surface formed from a cardboard-like fluid container.

As such, it may be appreciated that there is a continuing need for a new and improved method of forming a game and pet feeder which addresses both the problems of simplicity in construction and effectiveness in deployment, and in this respect, the present invention substantially fulfills this need.

SUMMARY OF THE INVENTION

In view of the foregoing disadvantages inherent in the known types of methods of forming game and pet feeders now present in the prior art, the present invention provides a method of forming a game and pet feeder wherein the same utilizes readily available PVO pipe to effect construction of a feeder. As such, the general purpose of the present invention, which will be described subsequently in greater detail, is to provide a new and improved method of forming a game and pet feeder which has all the advantages of the prior art method of forming game and pet feeders and none of the disadvantages.

To attain this, the present invention comprises a game and pet feeder formed by the steps of utilizing PVC pipe wherein an elongate cylinder of the pipe is utilized in conjunction with end caps. A first semi-cylindrical body is directed perpendicular to &he axis of the cylindrical body whereupon heat is applied to a surface extending above the slot and thereafter upon softening of the PVC pipe, a rod is directed against the surface overlying the slot and presented interiorly to force a forward tip of the material overlying the slot to engage a rear wall of the tube. Subsequently, a plurality of securement apertures are directed overlying the mouth formed by the inward directing of the material and a series of apertures are drilled through a lower end cap, whereupon the end cap is secured either through adhesive or mechanical fastening to a lowermost end of the cylindrical body. Subsequently, the top lid is positioned upon an upper end of the cylindrical body with an aperture directed diametrically therethrough to receive a first cotter pin and a second aperture directed coaxially of the lid to receive a second cotter pin for enabling suspension of the game and pet feeder.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of &he claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method of forming a game and pet feeder which has all the advantages of the prior art method of forming game and pet feeders and none of the disadvantages.

It is another object of the present invention to provide a new and improved method of forming a game and pet feeder which may be easily and efficiently manufactured and marketed.

It is a further object of the present invention to provide a new and improved method of forming a game and pet feeder which is of a durable and reliable construction.

An even further object of the present invention is to provide a new and improved method of forming a game and pet feeder which is susceptible of a low cost of manufacture with regard to both materials and labor, and which accordingly is then susceptible of low prices of sale to the consuming public, thereby making such methods of forming game and pet feeders economically available to the buying public Still yet another object of the present invention is to provide a new and improved method of forming a game and pet feeder which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the game and pet feeder of the instant invention in a partially constructed configuration.

FIG. 2 is an isometric illustration of the method of the instant invention in initial phase.

FIG. 3 is an isometric illustration of a step of directing a slot into the tubular body of the instant invention.

FIG. 4 is an isometric illustration illustrating the directing of a heat source at a surface overlying the slot.

FIG. 5 is an isometric illustration of the step of forcibly directing the triangular segment overlying the slot interiorly of the tubular body.

FIG. 8 is an isometric illustration depicting the drilling of a securement aperture through the lid and tubular body.

FIG. 9 is an isometric illustration depicting positioning of a threaded perch and securement members through the lid of the instant invention.

FIG. 10 is an orthographic cross-sectional view illustrating the mouth of the instant invention directed interiorly against an interior wall thereof.

DESCRIPTION OF THE PREFERRED EMBODIMENT

Figure 6:
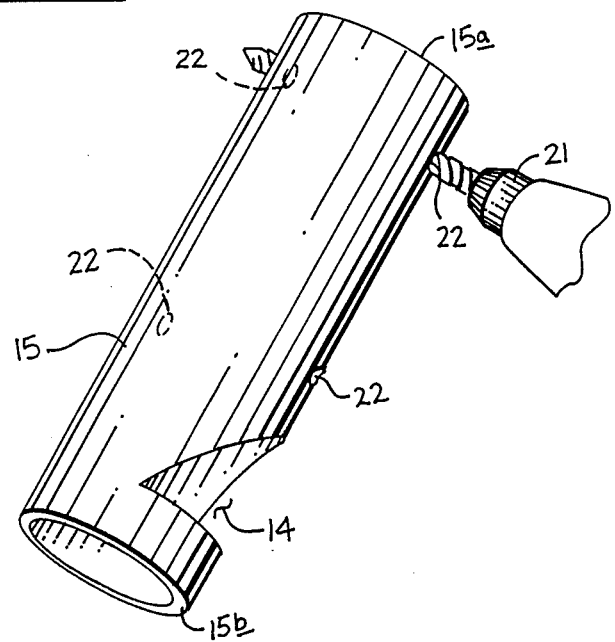
FIG. 6 is an isometric illustration depicting the forming of securement apertures through the tubular body.
Figure 7:
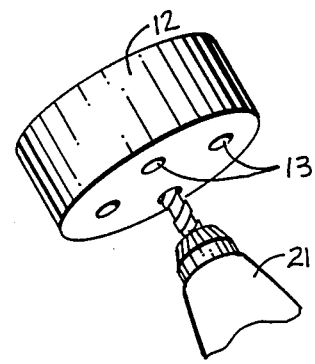
FIG. 7 is an isometric illustration illustrating the directing of drainage apertures through a bottom cap of the instant invention.

With reference now to the drawings, and in particular to FIGS. 1 to 10 thereof, a new and improved method of forming a game and pet feeder embodying the principles and concepts of the present invention and generally designated by the reference numeral 10 will be described.

More specifically, the method of forming a game and pet feeder of the instant invention 10 essentially comprises providing a predetermined length of PVC pipe defined by an elongate cylindrical body 15 with an upper end 15a and a lower end 15b, each end orthogonally oriented relative to an axis defined by the cylindrical body 15. A cylindrical cap 11 and a cylindrical base 12 of equal configuration are provided with an internal cavity of a predetermined diameter equal to the external diameter defined by the cylindrical body 15. A dispensing mouth 14 is positioned adjacent a lowermost end of the cylindrical body and formed therein, in a manner to be set forth below, and wherein the cylindrical base 12 is provided with a series of apertures 13 to effect drainage and provide a means for directing debris exteriorly through a bottom end of the game and pet feeder formed.

A semi-cylindrical slot 16 is formed, as illustrated in FIG. 3, adjacent the lower end 15b and is arranged orthogonally relative to the axis of the cylindrical body 15. Subsequently, a heat source 17 is directed at an exterior surface of the cylindrical body 15 immediately overlying the cylindrical slot, and upon adequate softening of the PVC pipe material, a forward end of a rod 19 is directed against the softened material and pushed interiorly of the cylindrical body until an apex of the softened material is positioned adjacent a interior wall of the cylindrical body, as illustrated in FIG. 10 for example. The triangular entrance segment 20 that is softened and directed interiorly form the dispensing mouth 14.

A subsequent step includes the use of a drill member 21 to initially form a plurality of diametrically aligned mounting apertures 22 directed and arranged orthogonally relative to the axis defined by the cylindrical body 15 to enable reception of elongate securement members, such as nails, to secure the feeder to a vertical surface, as desired.

A subsequent step utilizes the drill member 21 to form the base apertures 13 whereupon the cylindrical base 12 may subsequently be adhesively secured to the lowermost end 15b of the cylindrical body, or alternatively may be secured thereto utilizing a threaded bolt fastener 27 orthogonally directed relative to the axis of the cylindrical body and directed through the surrounding skirt of the cylindrical base 12 and into the cylindrical body. The threaded bolt therefore may perform a dual function as a securement member and as a perch for birds and the like utilizing the feeder so formed.

A subsequent step utilizes the drill member 21 to direct a diametrically aligned plurality of cap apertures 11 through the apron of the cap 11 and through the cylindrical body adjacent the upper end 15a. A first cotter pin 25 is directed through the cap apertures 28 with the legs bent over to secure the cap to the upper end of the cylindrical body and further enable selective removal of the cap 11 for periodic filling of the feeder with various pet food and the like. A further cap aperture 24 is coaxially directed through the cylindrical cap 11 to receive a second cotter pin 26 thereto, whereupon bending of the lowermost legs of the cotter pin to retain the second cotter pin 26 therein, the upper terminal loop formed by the second cotter pin may be utilized to secure flexible line for suspension of the feeder form overlying supports.

Accordingly, it is believed that the foregoing disclosure as to the usage and operation of the instant invention should be apparent, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of forming a game and pet feeder comprising the steps of:

providing an elongate, polymeric cylindrical body including a top end and a bottom end and arranging each end orthogonally to an elongate axis defined by the cylindrical body, and securing a bottom cap to the bottom end and a top cap to the top end, and forming a dispensing mouth with the cylindrical body adjacent the bottom end, and wherein the step of forming a dispensing mouth includes the steps of forming a semi-cylindrical slot directed orthogonally to the axis of the elongate body, and applying heat to a triangular segment overlying the slot until the segment is softened from a rigid to a semi-rigid segment, and forcibly directing a force member against an exterior surface of the segment and forcing the segment interiorly of the cylindrical body until the segment forms an apex and wherein the apex contacts an interior surface of the cylindrical body, and wherein the step of securing the bottom cap to the bottom end of the cylindrical body includes the step of forming a matrix of apertures through a bottom end surface of the bottom cap and subsequently securing the bottom cap to the bottom end of the cylindrical body, and wherein the step of securing the bottom cap to the bottom end of the cylindrical body includes the step of directing an elongate threaded member through a skirt of the bottom cap overlying the cylindrical body and further directing the threaded member through the cylindrical body adjacent the skirt to secure the cylindrical body and the bottom cap together, and wherein the threaded member is directed through the skirt of the bottom cap and the cylindrical body to provide a predetermined length of the threaded member extending exteriorly of the skirt and orthogonally relative to the axis of the cylindrical body and underlying the dispensing mouth.

2. A method of forming a game and pet feeder as set forth in claim 1 further including the step of directing a plurality of diametrically aligned securement apertures through the cylindrical body between the top cap and the bottom cap and spaced above the dispensing mouth for selective reception of securement members therethrough to secure the cylindrical body to a desired vertical surface.

3. A method of forming a game and pet feeder as set forth in claim 2 wherein the step of securing the top cap to the top end of the cylindrical body further includes the step of forming a first aperture coaxially through a top surface of the top cap and thereafter inserting a cotter pin therethrough and arranging the cotter pin with legs of the cotter pin directed interiorly of the cap and an open loop of the cotter pin directed exteriorly of the cap.

4. A method of forming a game and pet feeder as set forth in claim 3 including the further step of positioning the top end of the cylindrical body within the top cap, and directing a diametrically aligned plurality of apertures through a downwardly depending top cap skirt orthogonally therethrough and through the cylindrical body positioned adjacent the top cap skirt, and subsequently directing a further cotter pin through the plurality of apertures to selectively secure the top cap to the top end of the cylindrical body.

* * * * *